United States Patent [19]
Miller

[11] 3,838,889
[45] Oct. 1, 1974

[54] SKID CONTROL SYSTEM
[75] Inventor: Roger L. Miller, Ann Arbor, Mich.
[73] Assignee: Kelsey-Hayes Co., Romulus, Mich.
[22] Filed: Jan. 10, 1973
[21] Appl. No.: 322,541

[52] U.S. Cl............... 303/21 P, 303/20, 303/21 AF
[51] Int. Cl.............................................. B60t 8/08
[58] Field of Search ............... 188/181; 303/20, 21; 317/5; 324/161–162; 340/262–263, 52 R, 53

[56] References Cited
UNITED STATES PATENTS

| | | | |
|---|---|---|---|
| 3,523,712 | 8/1970 | Leiber............................ | 303/21 CG |
| 3,525,553 | 8/1970 | Carp et al........................ | 303/21 P |
| 3,583,773 | 6/1971 | Steinbrenner et al. ......... | 303/21 EB |
| 3,612,622 | 10/1971 | Riordan........................... | 303/21 P |
| 3,614,172 | 10/1971 | Riordan........................... | 303/21 BE |
| 3,620,577 | 11/1971 | Neisch et al. ................... | 303/21 EB |
| 3,640,588 | 2/1972 | Carp et al........................ | 303/21 P |
| 3,653,727 | 4/1972 | Kullberg et al.................. | 303/21 P |
| 3,682,515 | 8/1972 | Packer et al..................... | 303/21 BE |
| 3,709,565 | 1/1973 | Jonason et al.................. | 303/21 BE |

Primary Examiner—George E. A. Halvosa
Assistant Examiner—Stephen G. Kunin
Attorney, Agent, or Firm—Harness, Dickey & Pierce

[57] ABSTRACT

A skid control system for skid controlling a braked wheel of a vehicle wherein a vehicle reference signal comprising repetitive pulses (for example, digital pulses) is generated by electronic circuitry and is compared with a wheel signal comprising repetitive pulses (for example, digital pulses) derived from the skid controlled wheel. The pulse repetition rate of reference signal is preferably derived from a wheel of the vehicle and represents a speed substantially corresponding to the vehicle speed so long as vehicle deceleration does not exceed a predetermined value; but when that value is exceeded, the pulse repetitive rate of the reference signal changes in predetermined fashion to approximate vehicle speed. When the pulse repetition rate of the wheel speed signal differs from the pulse repetition rate of the reference speed signal by a predetermined amount, the braking of the skid controlled wheel is modulated thereby preventing wheel lock-up.

79 Claims, 7 Drawing Figures

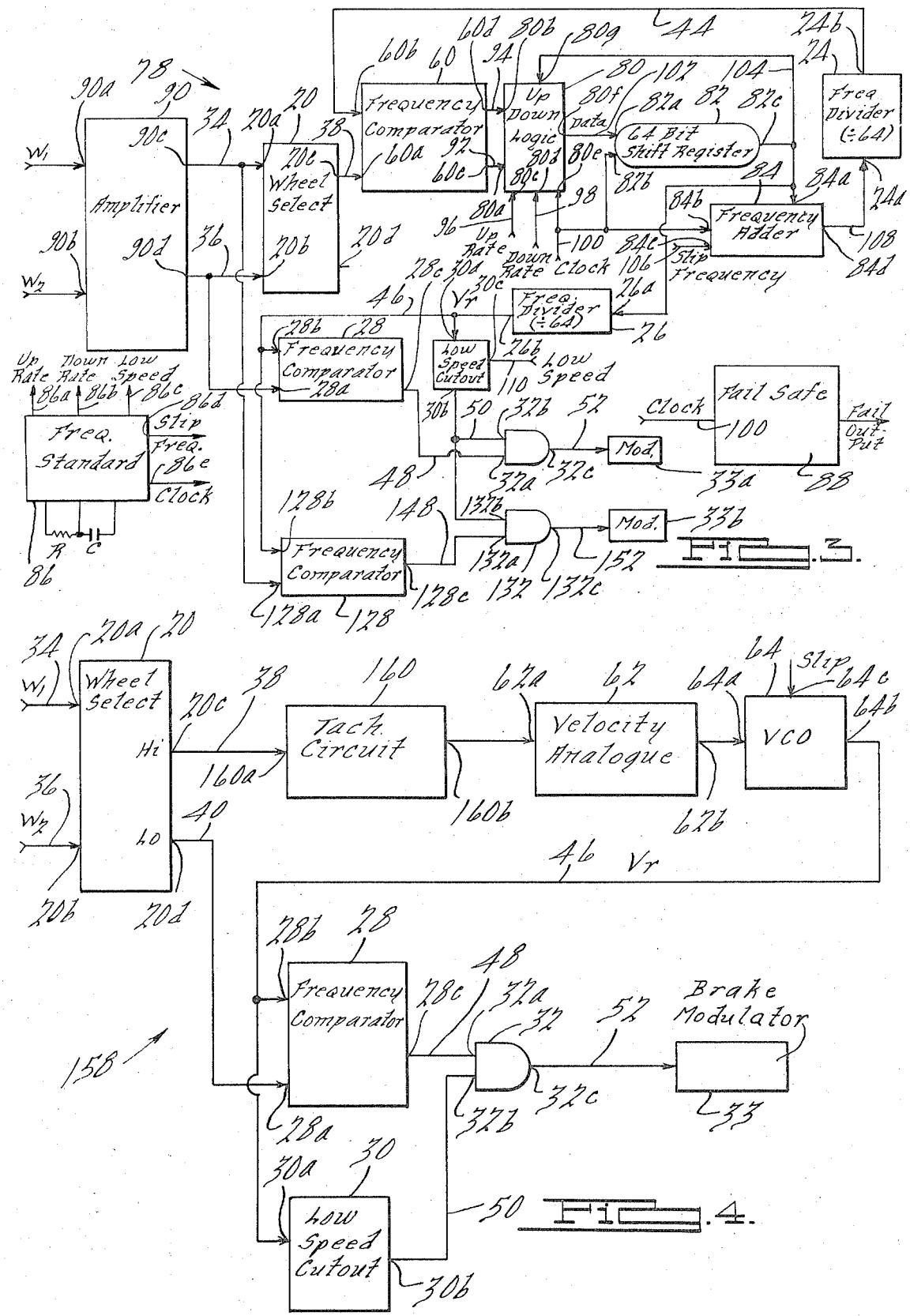

SKID CONTROL SYSTEM

BACKGROUND-SUMMARY OF THE INVENTION

The present invention relates generally to vehicle skid control systems and particularly to novel electronic circuitry for such systems.

Heretofore, various electronic circuits have been used in vehicle skid control systems. One particular circuit which has been found to provide satisfactory skid control performance is the vehicle velocity analogue circuit. A circuit of this type is disclosed in U.S. Pat. to Atkins, No. 3,578,819 assigned to the same assignee as the present application. The vehicle velocity analogue circuit develops an electrical analogue signal against which an analogue wheel speed signal derived from a skid controlled wheel is compared. The braking of the skid controlled wheel is modulated in part in accordance with the attainment of a predetermined difference between the two analogue signals. The vehicle skid control theory upon which this circuit operates provides satisfactory skid control performance without the greater complexity of hardware required in more expensive, sophisticated systems.

The present invention is directed to electronic circuitry for a vehicle skid control system which is predicated upon the same vehicle skid control theory. However in contrast to the prior circuit, the present circuitry does not require analogue signals for its operation in determining whether the braking of the skid controlled wheel is to be modulated. Rather in the circuit of the present invention there is provided a reference signal composed of repetitive pulses. (This signal is sometimes referred to herein as the repetitive reference signal.) The pulse repetition rate, or frequency of the signal, is modulated, or controlled, in such a way that it becomes the vehicle velocity reference. A repetitive wheel speed signal composed of repetitive pulses (sometimes referred to herein as the repetitive wheel speed signal) is derived from a skid controlled wheel so that the repetition rate of its pulses, or its frequency, represents the speed of the wheel. The frequency of the wheel speed signal is compared with the frequency of the reference signal, and the braking of the skid controlled wheel is modulated when the frequency of the wheel speed signal differs from the frequency of the reference signal by a predetermined amount.

As will be seen in greater detail hereinafter, the present invention can be constructed from digital circuit components to operate in digital fashion. Such circuit construction provides reliable, accurate performance and permits the use of solid state microcircuits. Accordingly, an electronic skid control circuit according to the present invention can be compactly packaged and constructed from commercially available circuit components. The circuit can operate with less susceptibility to such extraneous disturbances as noise, etc. A further advantage of the invention is that various configurations of commercially available circuit components are possible, and this affords a high degree of versatility in actual practice of the invention.

Additional advantages, features, benefits of the invention will be seen in the ensuing description and claims which are to be taken in conjunction with the accompanying drawings.

BRIEF DESCRIPTION OF THE DRAWINGS

The drawings illustrate a preferred embodiment of the invention in accordance with the best modes presently contemplated for carrying out the invention.

FIG. 3 is an electronic schematic diagram in block form of another electronic skid control circuit according to the present invention.

FIG. 4 is an electronic schematic diagram in block form of another electronic skid control circuit according to the present invention.

DESCRIPTION OF THE PREFERRED EMBODIMENT

Figure 1:
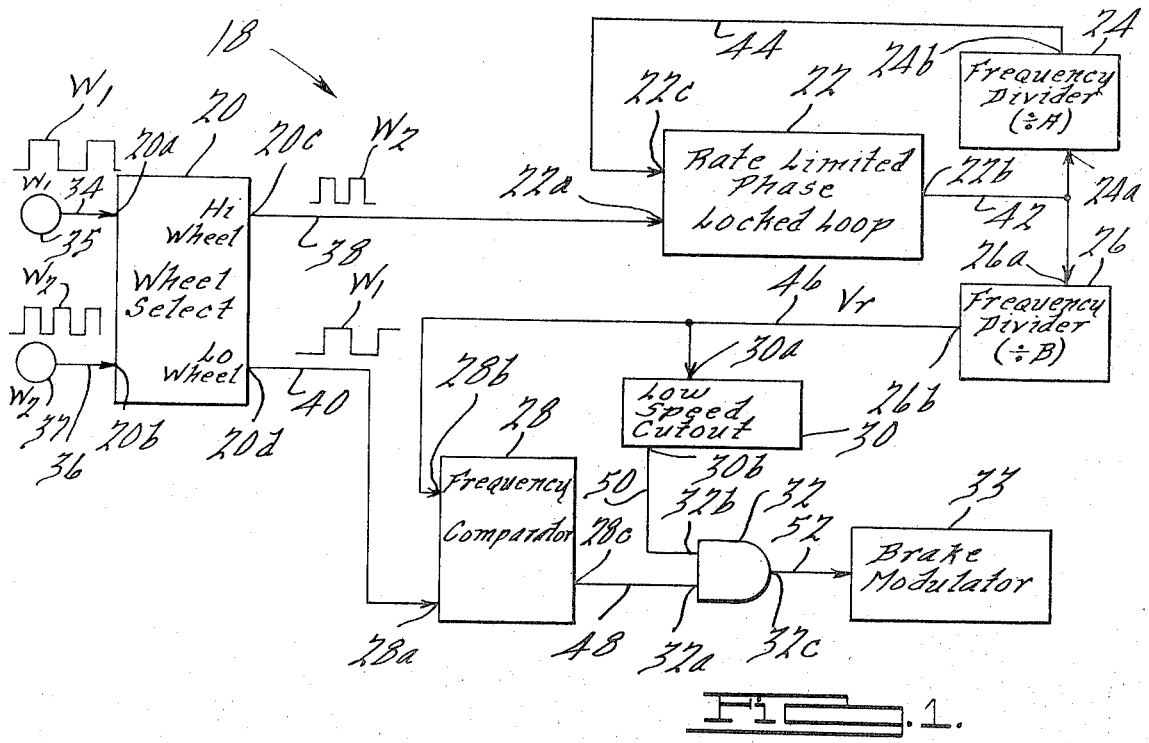
FIG. 1 is an electronic schematic diagram in block form of an electronic skid control circuit according to the present invention.

FIG. 1 illustrates the schematic diagram of a skid control circuit 18 according to the present invention. Circuit 18 comprises a wheel select logic circuit 20, a rate limited phase locked loop circuit 22, a frequency divider circuit 24, a frequency divider circuit 26, a frequency comparator circuit 28, a low speed cutout circuit 30 and a gating circuit 32. Circuit 18 is electrically coupled with a conventional brake modulator 33, details of which are omitted from the drawing for sake of clarity.

The inputs to circuit 18 are electronic digital signals designated $W_1$ and $W_2$. Signal $W_1$ is derived from a conventional wheel speed sensor 35 associated with one wheel of the vehicle; signal $W_2$ from another wheel speed sensor 37 associated with another wheel of the vehicle. Both signals may be approximated by square waves as shown. Signal $W_1$ is supplied to input 20a of wheel select logic circuit 2o via a connection 34; signal $W_2$ to input 20b of circuit 20 via a connection 36. Circuit 20 comprises two outputs 20c and 20d. Output 20c is coupled via a connection 38 to one input 22a of circuit 22; output 20d via a connection 40 to one input 28a of circuit 28. Circuit 22 comprises an output 22b which is coupled via a connection 42 to an input 24a of circuit 24 and also to an input 26a of circuit 26. Circuit 24 comprises an output 24b which is coupled via a connection 44 to another input 22c of circuit 22. Circuit 26 comprises an output 26b which is coupled via a connection 46 to an input 30a of circuit 30 and also to another input 28b of circuit 28. Circuit 28 comprises an output 28c which is coupled via a connection 48 to an input 32a of circuit 32 while circuit 30 comprises an output 30b which is coupled via a connection 50 to another input 32b of circuit 32. Circuit 32 comprises an output 32c which is coupled via a connection 52 to brake modulator 33. The signal supplied via connection 52 actuates the brake modulator to relieve brake pressure applied to the skid controlled wheel.

Circuit 18 operates as follows. Signal $W_1$ is a digital signal whose frequency represents the speed of the wheel with which sensor 35 is associated. Similarly, signal $W_2$ is a digital signal whose frequency represents the speed of the wheel with which sensor 37 is associated. Thus, one advantage of the present invention over the aforementioned analogue circuit is that digital to analogue conversion is not required for the wheel speed signals from the wheel speed sensors. (In FIG. 1, signal $W_2$ is illustrated as having a higher frequency than signal $W_1$ but this is merely for the purpose of explaining the operation of circuit 20 since signals $W_1$ and $W_2$ are not shown to any specific scale.) Desirably, the functional relationship between the frequency of each signal and the speed of its associated wheel is identical. In this way, both signals are identical in frequency when the speeds of their associated wheels are identical. Moreover, it is desirable to have a functional relationship wherein the signal frequency is proportional to the wheel speed and increases with increasing wheel speed and decreases with decreasing wheel speed. This is the relationship which exists for the conventional speed sensors used.

Circuit 20 comprises means for comparing the frequency of signal $W_1$ with the frequency of signal $W_2$ and for causing the signal having a higher frequency to be duplicated at terminal 20c and the signal having a lower frequency to be duplicated at terminal 20d. (Thus, signal $W_2$ is illustrated at output 20c and signal $W_1$ at output 20d for purposes of explanation.) In this way, the signal representing the speed of the faster wheel is supplied to input 22a of circuit 22 while the signal representing the speed of the slower wheel is supplied to input 28a of circuit 28.

Circuits 22 and 24 cooperate to develop a digital signal at output 22b whose frequency is equal to a predetermined multiple (hereinafter designated by the constant A) of the frequency of the faster wheel signal so long as the rate of change of the frequency of the faster wheel signal does not exceed predetermined limits explained below. In this way the frequency of the signal at output 22b tends to accurately follow changes in the frequency of the signal at input 22a within these predetermined limits. More specifically, circuits 22 and 24 cooperate to cause the phase of the signal at input 22c to be locked to the phase of the signal at input 22a. Thus, when the frequency of the faster wheel signal increases and decreases in response to wheel acceleration and deceleration, the frequency of the signal at input 22c tends to follow these changes. Since circuit 24 is constructed to divide the frequency of the signal at input 24a by the same constant A, the frequency of the signal at input 22c must be equal to the frequency of the signal at output 22b divided by the constant A. Hence, the frequency of the signal at output 22b likewise tends to follow changes in the frequency of the faster wheel speed signal. For wheel accelerations and decelerations which are encountered during normal vehicle operation, circuits 22 and 24 are constructed to respond rapidly to frequency changes in the faster wheel speed signal to that the frequency of the signal at output 22b is always substantially equal to the frequency of the faster wheel speed signal multiplied by the constant A.

However, in accordance with one inventive feature of the present disclosure, circuit 22 is constructed to limit the rate at which the frequency of the signal at output 22b can decrease. For deceleration of the faster running wheel which exceeds a predetermined maximum deceleration, the corresponding rate of decrease in the frequency of the faster wheel signal exceeds that which circuit 22 can follow. Accordingly, when this predetermined maximum wheel deceleration of the faster wheel is exceeded, the frequency of the signal at output 22b still tends to follow the frequency of the faster wheel signal at input 22a but can decrease only at the predetermined maximum rate established by circuit 22.

The signal at output 22b is also frequency divided by circuit 26. This frequency division divides the frequency by a constant B so that the frequency of the signal produced at output 26b represents the speed of the faster running wheel multiplied by A and divided by B. This latter signal is the vehicle velocity reference signal and is hereinafter designated $V_r$. Signal $V_r$ is used as a vehicle speed reference for skid controlling a skid controlled wheel during braking. In order to procure optimum skid control performance, it is desirable to have the frequency of signal $V_r$ represent a speed which substantially corresponds to, but is actually somewhat less than the speed of the faster running wheel so long as the deceleration of the faster running wheel does not exceed a predetermined maximum. This is done by making the ratio of A to B slightly less than unity. A specific value for the ratio of A to B will depend on the specific characteristics of the skid control system and hence may be selected from a range of values. A ratio of 80% represents a typical value which may be used. The rate limiting of the frequency of signal $V_r$, as provided by circuit 22, is selected in conjunction with the selected ratio of A to B to provide optimum vehicle velocity as a function of time during deceleration for skid controlling a skid controlled wheel when the preselected maximum value of wheel deceleration is exceeded. The rate of decrease in frequency of signal $V_r$ should be such during limiting thereof that it is always slightly greater than the maximum expected deceleration of the vehicle. Hence, the particular way in which $V_r$ is rate limited will depend to some degree upon the deceleration characteristics of the vehicle. For a fixed ratio of A to B, the amount of slip (i.e., the difference between the actual speed of the wheel and the reference speed as represented by signal $V_r$) is a function of the speed of the faster running wheel and hence variable slip is provided by circuit 18. As will be seen in description of other drawing figures, skid control circuitry according to the present invention may be constructed to develop either variable or fixed slip. In other words, the particular functional relation between the frequency of signal $V_r$ and the frequency of the faster wheel signal need not be a fixed ratio (i.e., need not be A ÷ B) and other functional relationships may be provided by the particular construction of the individual circuits.

Circuit 28 comprises means for comparing the frequency of the signal at input 28b with the frequency of the signal at input 28a and for producing an output signal at output 28c when the frequency of the signal at input 28a is less than the frequency of the signal at input 28b. With the ratio of A to B less than unity, the frequency of the vehicle velocity reference signal $V_r$ is less than the frequency of the signal from the slower wheel for normal operation of the vehicle when both wheels are rotating at substantially the same speed. In this condition, no output signal is developed by circuit 28. However, the ratio of A to B is such that when either one or both of the two wheels is at an incipient skid condition, the frequency of the signal from the slower wheel falls below the frequency of the vehicle velocity reference signal $V_r$. In this condition, circuit 28 develops an output signal at output 28c which in turn causes the brake pressure to the skidding wheel to be relieved provided that the vehicle speed reference is greater than a certain minimum as established by circuit 30.

Circuits 30 and 32 are provided to inhibit brake pressure modulation by circuit 28 when the vehicle speed reference is at a very low speed, for example 5 mph. For this purpose, circuit 30 monitors the frequency of the vehicle velocity reference signal $V_r$ and provides an output signal to close gate circuit 32 when the frequency of signal $V_r$ falls below the frequency corresponding to a vehicle speed of five mph. Thus, with gate circuit 32 closed, an output signal from circuit 28 will not be transmitted to the output of the gate and hence brake modulator 33 will not be actuated to modulate the brakes. The reason for this is that modulation is typically not desired when the vehicle speed is very low.

The way in which circuit 18 operates to modulate the braking of the skid controlled wheel can now be fully appreciated. In the illustrated circuit, signals $W_1$ and $W_2$ are derived from two wheels of the vehicle which are on the same axle. In conventional present day hydraulic brake systems, split cylinder type systems are used. In other words, on a four wheel vehicle, for example, the front wheel brakes are braked together from one source of pressure fluid and the two rear wheels are braked together from a separate, independent source of pressure fluid. The particular circuit illustrated, therefore, contemplates modulation of brake pressure at one set of wheels whenever either one of the two wheels of that set is at an incipient skid condition. With this arrangement, the speed of the faster running wheel provides an input to circuit 18 which taken as representing the speed of the vehicle. From this input signal, skid control circuit 18 develops vehicle velocity reference signal $V_r$ such that the frequency of signal $V_r$ represents a speed substantially corresponding to the actual vehicle speed (as represented by the faster running wheel and modified by the ratio of A to B) so long as deceleration of the faster running wheel does not exceed a predetermined maximum. The ratio of A to B is selected along with the maximum rate at which the frequency of signal $V_r$ can decrease so that when the deceleration of even the faster running wheel exceeds the predetermined maximum (i.e., both wheels at skidding condition), the frequency of signal $V_r$ changes in a fashion representing optimum vehicle velocity as a function of time during skid controlled braking. Circuit 18 operates to modulate the brakes in such a way that the actual vehicle deceleration is caused to follow the optimized vehicle deceleration as represented by the decreasing frequency of signal $V_r$.

While the illustrated arrangement of FIG. 1 discloses a specific type of system, it will be appreciated that the invention contemplates skid control of one or more wheels and that the vehicle speed signal from which the vehicle velocity reference signal $V_r$ is established need not be necessarily derived from a wheel of the vehicle.

Figure 2:
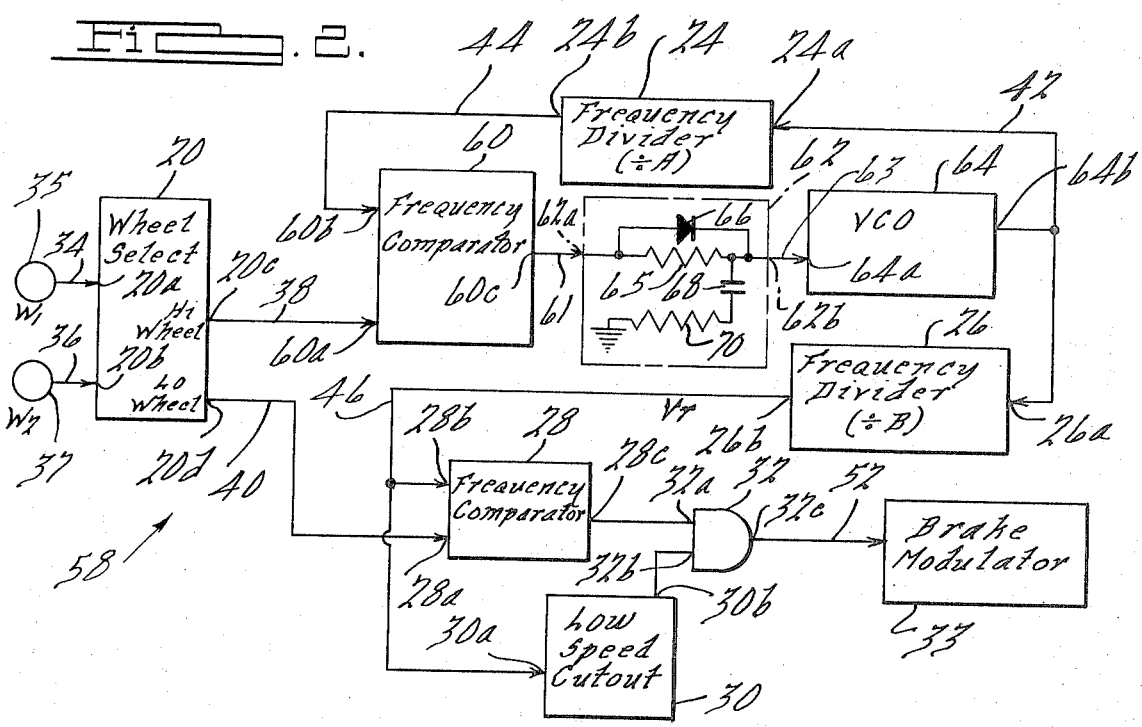
FIG. 2 is an electronic schematic diagram in block form of another electronic skid control circuit according to the present invention.

FIG. 2 illustrates another skid control circuit 58 which is the same as circuit 18 except that circuit 22 of FIG. 1 is replaced in FIG. 2 by a frequency comparator circuit 60, a vehicle analogue velocity circuit 62 and a voltage controlled oscillator (VCO) circuit 64. Like numerals are used to designate like components in both figures. Frequency comparator circuit 60 comprises an input 60a to which output 20c of circuit 20 is coupled via connection 38 and another input 60b to which output 24b of circuit 24 is coupled via connection 44. Circuit 60 also comprises an output 60c which is coupled via a connection 61 to an input 62a of circuit 62. Circuit 62 comprises a resistor 65, a diode 66, a capacitor 68 and a resistor 70 which are connected as illustrated. Circuit 62 is like that disclosed in U.S. Pat. No. 3,578,819, as mentioned earlier. An output 62b of circuit 62 is coupled via a connection 63 to an input 64a of circuit 64 and an output 64b of circuit 64 is in turn coupled via connection 42 to inputs 24a and 26a of circuits 24 and 26 respectively.

The overall operation of circuit 58 is identical to that of circuit 18. In other words, the frequencies of signals $W_1$ and $W_2$ are compared by circuit 20 with the signal from the faster wheel being used to eastablish the vehicle reference speed signal $V_r$ and the signal from the slower wheel being used for comparison with signal $V_r$. Therefore, the only aspects of FIG. 2 which need be described in greater detail are the construction and operation of circuits 60, 62 and 64.

Circuit 60 comprises means for generating a positive output signal at output 60c when the frequency of the signal at input 60a exceeds the frequency of the signal at input 60b. When the two frequencies are equal, or the frequency of the signal at input 60b exceeds the frequency of the signal at input 60a, then the signal at output 60c is zero. When a positive signal is produced at output 60c, capacitor 68 charges via diode 66 at a rate which is established by resistor 70. Desirably, resistor 70 is selected so that the voltage of capacitor 68 substantially follows the voltage at output 60c. The voltage developed across capacitor 68 is applied as an input to circuit 64. Circuit 64 is a conventional voltage controlled oscillator, for example a multivibrator type circuit. Circuit 64 comprises means for developing a digital output signal at output 64b whose frequency is a function of the magnitude of the voltage applied at input 64a. Desirably, the frequency of the output signal of circuit 64 is proportional to the voltage of capacitor 68.

The operation of circuits 60, 62 and 64 can best be explained as follows. Assume that the faster wheel is accelerating. As the wheel accelerates, the frequency of the signal at input 60a increases. This makes the output of circuit 60 positive, and causes capacitor 68 to become increasingly positively charged. As a result, the frequency of the output signal of circuit 64 increases. When the wheel speed levels off at a constant speed, the frequency of the signal at output 64b is equal to the frequency of the input waveform at input 60a multiplied by the constant A. With circuit 24 dividing the frequency of the signal at output 64b by the contant A, the frequency of the signal at input 60b now equals the frequency of the signal at input 60a, and hence the signal at output 60c now equals zero. Since the output of circuit 60 is now zero, capacitor 68 begins to discharge through resistors 65 and 70. As a result, the voltage input to circuit 64 begins to drop and this tends to reduce the frequency of the signal at output 64b. However, as soon as the frequency of the signal at output 64b drops, so does the frequency of the signal at input 60b and this in turn causes the output of circuit 60 to return to a positive value for replenishing the slight charge drawn from capacitor 68 during discharge thereof. So long as constant speed is maintained, the voltage across capacitor 68 fluctuates in this fashion. However the fluctuation is sufficiently small that the frequency of the signal at output 64c remains substantially constant. Thus, the frequency of the signal at output 64b always tends to follow the frequency of the faster wheel signal for the expected range of wheel acceleration. As the speed of the faster wheel decreases during vehicle deceleration, the output of circuit 60 remains at zero so that capacitor 68 can discharge to reduce the frequency of the signal at output 64b. Thus, the frequency of the output signal at 64b tends to follow the frequency of the faster wheel signal during deceleration thereof so long as the wheel deceleration does not exceed a predetermined maximum. When this predetermined maximum deceleration is exceeded, capacitor 68 cannot discharge fast enough to keep pace since its discharge rate is limited by resistor 70 and resistor 65. Therefore, the maximum rate at which the frequency of the signal at output 64b can decrease is determined by the specific values of components selected for circuit 62. In this way, the signal developed at output 64b is functionally related to the input signal at input 60a in substantially the same way that the signal at output 22b in FIG. 1 is functionally related to the input signal at input 22a. The remainder of the circuit of FIG. 2 is identical with the remainder of the circuit of FIG. 1.

FIG. 3 illustrates another skid control circuit 78 according to the present invention. In FIG. 3, components which are the same as in the previous figures are identified by like numerals. The overall operation of circuit 78 is similar to the overall operation of circuits 58 and 18 above. Insofar as modulation of the brakes is concerned, however, the circuit of FIG. 3 has an individual modulator for each wheel and accordingly the circuit is constructed to provide an individual output for each modulator rather than a single output as in circuits 18 and 58 above. In addition to the components of circuits 18 and 58 which are utilized in circuit 78, circuit 78 comprises an up-down logic circuit 80, a shift register circuit 82, a frequency adder circuit 84, an additional frequency comparator circuit 128, an additional gating circuit 132, a frequency standard circuit 86, a fail safe circuit 88 and an amplifier circuit 90.

Frequency standard circuit 86 comprises means for generating five digital signals which are utilized in circuit 78. These signals, which are developed at respective outputs 86a through 86e of circuit 86 are: an up-rate signal, a down-rate signal, a low speed signal, a slip frequency signal, and a clock signal. The characteristics of these signals will be explained as the description of circuit 78 proceeds. Amplifier circuit 90 is connected between the wheel speed sensors and circuit 20. Circuit 90 comprises inputs 90a and 90b and outputs 90c and 90d. Input 90a is coupled directly with the wheel speed sensor from which signal $W_1$ is derived while the corresponding output 90c is coupled via connection 34 with input 20a of circuit 20. Similarly, input 90b is directly coupled with the wheel speed sensor from which signal $W_2$ is derived and the corresponding output 90d is coupled via connection 36 with input 20b of circuit 20. Circuit 90 amplifies each of the signals coming directly from the wheel speed sensors. While amplifier 90 is often desirable, it will be appreciated that such amplification is unnecessary where the signals coming directly from the sensors are themselves suitable as inputs to the electronic circuitry. Outputs 90c and 90d are also respectively coupled with inputs 128a and 28a respectively of circuits 128 and 28 respectively. Output 20c of circuit 20 is coupled via connection 38 to input 60a of circuit 60. Output 20d is not connected in circuit.

Output 60c of circuit 60 is coupled via a connection 92 to an input 80a of circuit 80, and another output 60d of circuit 60 is coupled via a connection 94 to another input 80b of circuit 80. Circuit 80 comprises additional inputs 80c, 80d and 80e, which are coupled via connections 96, 98 and 100, respectively, with outputs 86a, 86b and 86e of circuit 86. Circuit 80 further comprises an output 80f coupled via a connection 102 to an input 82e of circuit 82. Another input 82b of circuit 82 is coupled via connection 100 with output 86e. An output 82c of circuit 82 is coupled via a connection 104 with another input 80g of circuit 80, an input 84a of circuit 84, and input 26a of circuit 26. Circuit 84 comprises additional inputs 84b and 84c which are coupled with outputs 86e and 86d respectively. An output 84d of circuit 84 is coupled via a connection 108 with input 24a of circuit 24. Output 24b of circuit 24 is connected via connection 44 to input 60b of circuit 60. The output 26b of circuit 26 is coupled both to input 28b of circuit 28 and to input 128b of circuit 128. Output 28c is coupled to input 32a as in the previous circuits and in like fashion output 128c of circuit 128 is coupled to input 132a of circuit 132 via a connection 148. Output 30b of circuit 30 is coupled via connection 50 to input 32b of circuit 32 as in the previous circuits and is also coupled to input 132b of circuit 132. Output 32c of circuit 32 is coupled via connection 52 with the brake modulator 33a associated with the wheel from which signal $W_2$ is derived; in like fashion output 132c of circuit 132 is coupled via connection 152 with the brake modulator 33b associated with the wheel from which signal $W_1$ is derived. In FIG. 3 an additional input 30c of circuit 30 is coupled with output 86c of circuit 86 via a connection 110.

The operation of circuits 24, 26, 60, 80, 82 and 84 is first explained before describing the overall operation of circuit 78. Circuit 60 operates in the same way in both circuits 58 and 78. However, in circuit 78 an additional output 60d is also utilized. Circuit 60 operates to develop an output signal at output 60c only when the frequency of the input signal at input 60a is greater than the frequency of the signal at input 60b and to produce an output signal at output 60d only when the frequency of the signal at input 60b exceeds the frequency of the signal at input 60a.

Circuit 60 controls the number of bits in shift register 82 in accordance with the signals received from circuit 60. When a signal is present at input 80a (which means that the frequency of the signal at input 60b is less than the frequency of the signal at input 60a), circuit 80 operates to increase the number of bits in shift register 82. When a signal is present at input 80b (which means that the frequency of the signal at input 60a is less than the frequency of the signal at input 60b), circuit 80 operates to decrease the number of bits in shift register 82.

Thus bits enter shift register 82 as data via connection 102. When a signal is present at neither input 80a nor input 80b, circuit 80 maintains the number of bits already present in shift register 82.

Shift register 82 is connected with circuit 80 and circuit 86 so that the bits in the shift register tend to circulate in a loop from output 82c via connection 104 back to input 80g of circuit 80 and then from output 80f via connection 102 to input 82a of shift register 82. As illustrated in FIG. 3, shift register 82 is a sixty-four bit shift register. Bits progress through shift register 82 from input 82a to output 82c, advancing one position in shift register 82 for each clock pulse received at input 82b. In other words, after sixty-four clock pulses, a bit entered at input 82a will appear at output 82c. When signals are present at neither input 80a nor input 80b, a bit appearing at output 82c is returned via circuit 80 to reenter the shift register at input 82a upon the occurrence of the immediately succeeding clock pulse. In this way, the number of bits in shift register 82 remains constant so long as the frequency of the signal at input 60a is equal to the frequency of the signal at input 60b.

When a signal is present at input 80a, circuit 80 causes additional bits to be entered in shift register 82. The rate at which bits are entered is determined by the up-rate signal supplied to circuit 80. The up-rate signal is selected so that for the expected rate of increase in frequency of the signal at input 60a (which represents the expected range of wheel acceleration) the frequency of the signal developed at input 60b will closely follow these changes. As will be seen hereinafter, this means that the frequency of signal $V_r$ will substantially correspond to the speed of the faster running wheel so long as wheel deceleration does not exceed a predetermined maximum value.

When a signal is present at input 80b circuit 80 operates to remove bits from shift register 82. Circuit 80 does this by preventing recirculation of bits from output 82c to input 82a. However, the rate at which bits are removed from shift register 82 is determined by the down-rate signal supplied to circuit 80. So long as wheel deceleration does not exceed a predetermined maximum value, bits are removed from shift register 82 such that the decreasing frequency of the signal at input 60b follows the decreasing frequency of the signal at input 60a. However, when the maximum wheel deceleration is exceeded, the down-rate signal limits the rate at which bits are removed from shift register 82. Thus, the frequency of the output signal at output 82c is functionally related to the frequency of the input signal at input 60a in much the same fashion as is the signal at output 22b to the signal at input 22a in FIG. 1. However, as will be explained, there are some differences.

Circuit 84 develops a signal at output 84d whose frequency equals the sum of the frequencies of the signals at inputs 84a and 84c. Circuit 24 divides the frequency of this signal by a factor of sixty-four (which factor is analogous to the constant A of FIGS. 1 and 2) and supplies this frequency divided signal to input 60b. Circuit 26 also divides the frequency of the signal at output 82c by a factor of sixty-four and as will become apparent the signal at output 26b is the vehicle velocity reference signal $V_r$.

The overall operation of circuit 78 can now be explained. Assuming that the frequency of the signal at input 60b is equal to the frequency of the signal at input 60a, then the frequency of the signal at output 82c represents the speed of the faster running wheel multiplied by sixty-four minus the speed represented by the slip frequency. Accordingly, the frequency of signal $V_r$ at output 26a represents the speed of the faster wheel minus the slip factor divided by sixty-four (the slip factor divided by sixty-four being a constant). As the wheel accelerates and decelerates during normal vehicle operation, this same relation is maintained. However, when the faster running wheel decelerates at a rate greater than the predetermined maximum deceleration, then the rate at which the frequency of signal $V_r$ can decrease is limited to a predetermined maximum rate established by the down-rate signal. Accordingly, it will be appreciated that the frequency of signal $V_r$ is rate controlled as in the previous circuits. In the present circuit, subtraction of a constant slip factor provides a constant wheel slip and this is in contrast to the previous circuits which employed a variable wheel slip. In other words, for normal vehicle operation (i.e., where the deceleration of the faster running wheel does not exceed the predetermined maximum), the present circuit generates signal $V_r$ such that the frequency thereof represents actual vehicle speed minus a constant slip speed whereas the previous circuits each generated signal $V_r$ such that the frequency thereof represents actual vehicle speed multiplied by a constant.

However, the generic concept in all three circuits 18, 58 and 78 remains the same since the frequency of signal $V_r$ represents a speed substantially corresponding to actual vehicle speed so long as deceleration of the faster running wheel does not exceed a predetermined maximum and when that maximum is exceeded, changes at a controlled rate.

Thus, operation of circuit 78 may be summarized as follows. During normal vehicle operation, the bits circulating in shift register 82 produce an output signal at output 82c whose frequency corresponds to the speed of the faster running wheel. Should either one of the wheels go into an incipient skid condition, the respective circuit 28 or 128 provides a skid control signal for actuating the modulator associated with that wheel to relieve brake pressure to the brakes of that wheel. In this way, each wheel is independently skid controlled and caused to decelerate in accordance with the vehicle velocity reference signal $V_r$. Circuit 30 may be constructed in the same way as circuits 28 and 128. The frequency of the low speed signal supplied to input 30c is compared with the frequency of signal $V_r$ of input 30a. When the frequency of signal $V_r$ drops below the frequency of the low speed signal, circuit 30 produces a signal at output 30b which prevents transmission of signals through gates 32 and 132 so that the brake modulators 33a and 33b cannot be actuated. Fail safe circuit 88 may be constructed in accordance with conventional fail safe circuits heretofore utilized in skid control systems. Circuit 88 monitors one or more selected signal in circuit 78 and provides an output signal which is used to prevent actuation of the brake modulators when a failure occurs. For example, one signal which circuit 88 may monitor is the clock signal as illustrated in FIG. 3.

FIG. 4 illustrates a circuit 158 which is similar to circuit 58 of FIG. 2. In both figures, like numerals identify like components. The differences between the two circuits are as follows. In circuit 158, frequency divider circuits 24 and 26 are omitted, and frequency comparator circuit 60b is replaced by a tach circuit 160 having an input 160a and an output 160b. Circuit 64 includes means for adjusting the frequency of its output signal by a selected slip factor and this is indicated at 64c.

Circuit 158 operates as follows. Tach circuit 160 generates a DC voltage at output 160b whose magnitude represents the speed of the faster running wheel. This signal is supplied to circuit 62 and circuit 62 operates as described previously in FIG. 2 to produce an output whose magnitude corresponds to the magnitude of the input so long as the deceleration of the faster running wheel does not exceed a predetermined maximum value. When the predetermined maximum deceleration is exceeded, the voltage output of circuit 62 cannot follow the sudden change in input voltage since discharge thereof is limited by resistors 65 and 70. Since the rate at which the output of circuit 62 decreases is thus limited, the rate at which the frequency of the output signal of circuit 64 decreases is likewise limited. In this way, circuit 158 performs the same overall skid control function as circuit 58. The slip factor causes the frequency of the output signal at output 64b to represent the speed of the faster running wheel multiplied by a selected fraction, for example 80 percent. The slip factor is selected in conjunction with the rate limiting of circuit 62 to produce an optimum vehicle velocity reference signal $V_r$ when the deceleration of the faster wheel exceeds the predetermined maximum. The slip factor may be in the form of a bias voltage (designated at 64c) for setting a selected bias on circuit 84.

Figure 5:
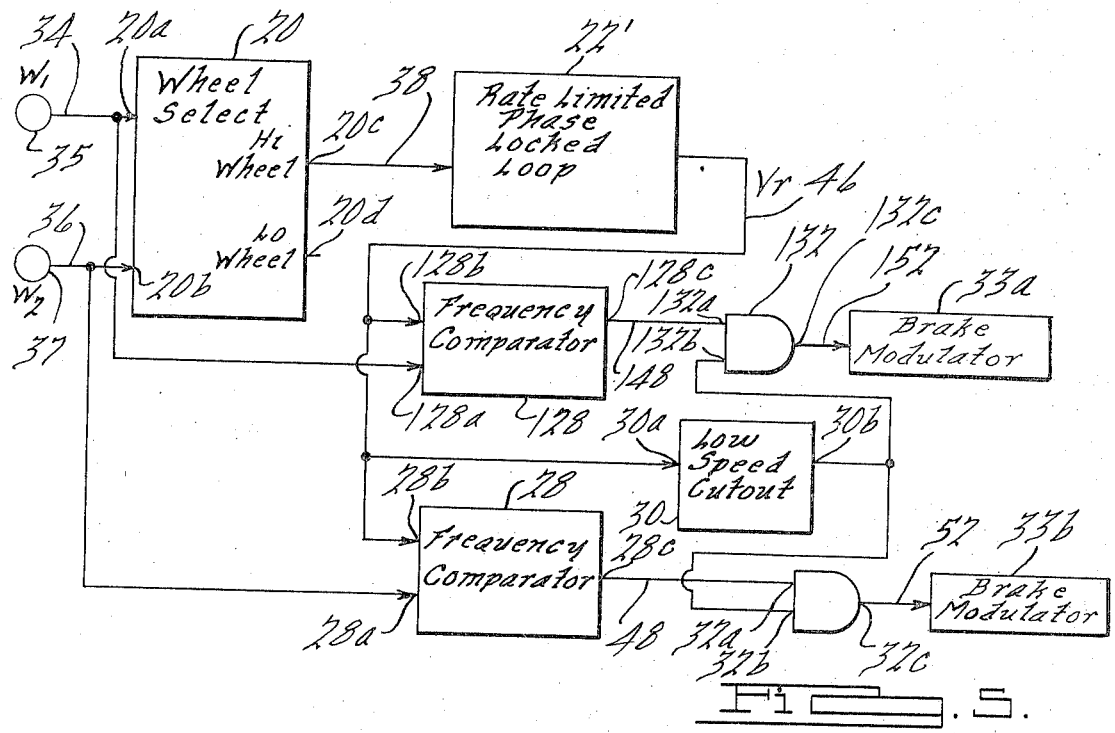
FIG. 5 is an electronic schematic diagram in block form of another electronic skid control circuit according to the present invention.

FIG. 5 discloses a circuit 218 which is very similar to circuit 18 of FIG. 1. The only difference between circuits 18 and 218 is that individual wheel modulators 33a and 33b are provided for each wheel. Thus, two frequency comparators 28 and 128 are required in FIG. 5 and each compares the speed of its associated wheel with the frequency of signal $V_r$. In FIG. 5, circuit 22' represents circuits 22, 24 and 26 in FIG. 1.

Figure 6:
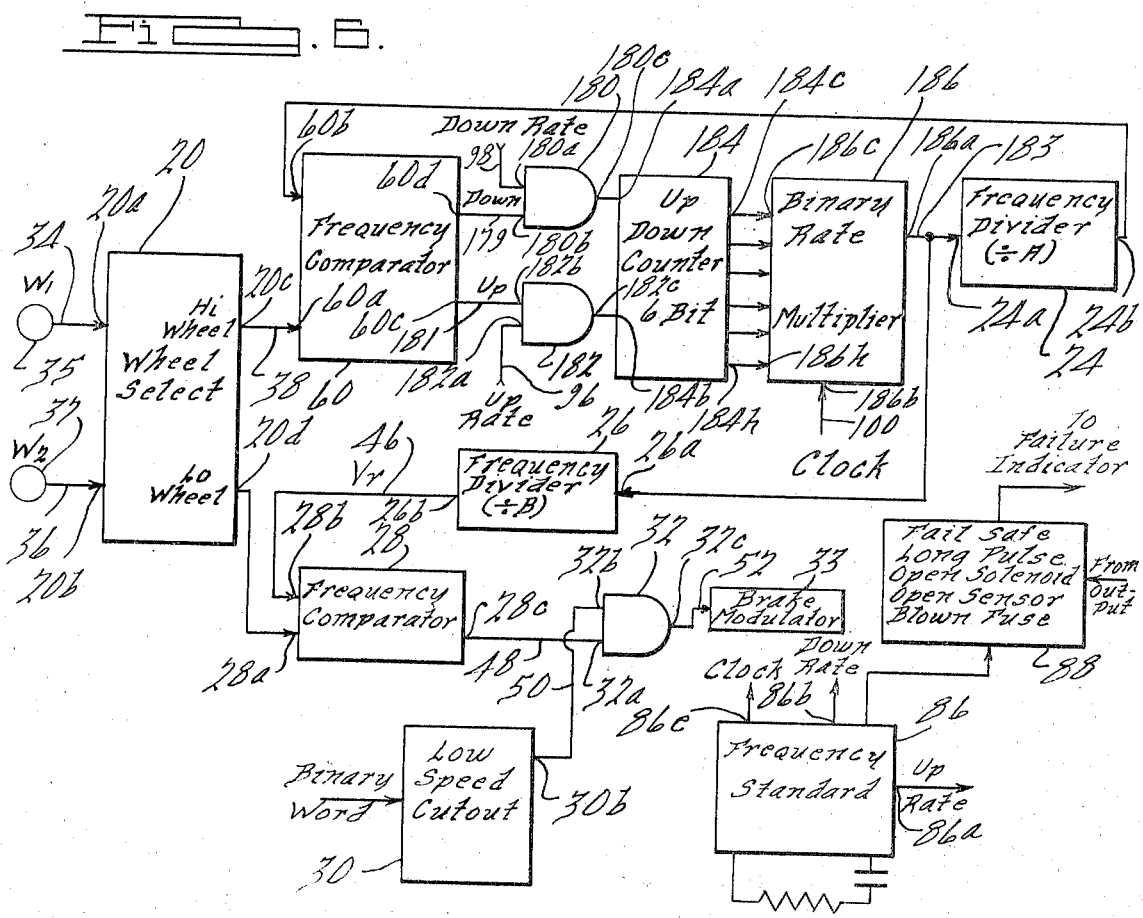
FIG. 6 is an electronic schematic diagram in block form of another electronic skid control circuit according to the present invention.

FIG. 6 illustrates another skid control circuit 178. In circuit 178, like components from the previous figures are designated by like numerals. In addition, circuit 178 comprises a gating circuit 180, a gating circuit 182, an up-down counter circuit 184, and a binary rate multiplier circuit 186. Circuit 178 is illustrated for use with a single modulator for modulating the brake pressure to both wheels. Gating circuit 180 comprises an input 180a which is coupled via connection 98 with output 86b of circuit 86, another input 180b which is coupled via connection 179 with output 60d of circuit 60, and an output 180c which is coupled with an input 184a of circuit 184. Gating circuit 182 comprises an input 182a which is coupled via connection 96 with output 86a of circuit 86, another input 182b which is coupled via connection 181 with output 60c of circuit 60 and an output 182c which is coupled with another input 184b of circuit 184. Circuits 180 and 182 are identical and each causes the signal at its first-mentioned input to be transmitted to its output when a suitable gating signal exists at its second-mentioned input. Circuit 184 comprises outputs 184c through 184h which are respectively coupled with inputs 186c through 186h of circuit 186. Circuit 186 includes an output 186a and another input 186b. Output 186a is coupled via a connection 183 with both inputs 24a and 26a of circuits 24 and 26. Input 186b is coupled via connection 100 with output 86e.

The overall operation of circuit 178 is identical to the overall operation of circuit 58. In other words, the frequencies of signals $W_1$ and $W_2$ are compared by circuit 20 with the signal from the faster wheel being used to establish the vehicle reference speed signal $V_r$ and the signal from the slower wheel being used for comparison with signal $V_r$. Therefore, the only aspects of FIG. 6 which need be described in greater detail are the construction and operation of circuits 24, 60, 180, 182, 184 and 186.

As the faster running wheel accelerates, circuit 60 provides a gating signal at output 60c. Circuit 182 in turn causes pulses of the up-rate signal to be counted by circuit 184. The count contained in circuit 184 is proportional to the speed of the faster running wheel. Circuit 186 and circuit 24 modify the count in counter 184 such that when the wheel is running at constant speed the frequency of the signal at input 60b is identical to the frequency of the signal at input 60a. In this condition, neither the up-rate nor the down-rate signal is gated to circuit 184. Hence the count in counter 184 remains unchanged.

Should the wheel speed change, the count in circuit 184 is likewise changed. If the wheel accelerates, the frequency of the signal at input 60a suddenly becomes greater than the frequency of the signal at input 60b. This causes gating circuit 182 to be energized so that additional counts are registered in circuit 184. Hence the output of circuit 24 as feedback to input 60b increases to follow the frequency of the wheel speed signal. The frequency of the uprate signal is selected to insure that the output of circuit 186 faithfully follows the wheel speed input for the customary wheel accelerations which are encountered. However, when the wheel decelerates at a rate beyond a predetermined value, the down-rate is limited such that signal $V_r$ is caused to decrease in frequency at a predetermined maximum rate. Fail safe circuit 88 as illustrated in FIG. 6 is constructed to monitor failure of various components; for example, a blown fuse, an open sensor, an open solenoid, and a long pulse (i.e., a modulating pulse whose duration exceeds a predetermined value). Circuit 30 in FIG. 6 may be constructed to perform the same overall function as in the previous circuits but in a somewhat different manner. In FIG. 6, a binary word input is supplied to circuit 30 and this binary word represents the speed below which operation of modulator 33 is to be inhibited. The binary word is derived from the output of counter 184.

Figure 7:
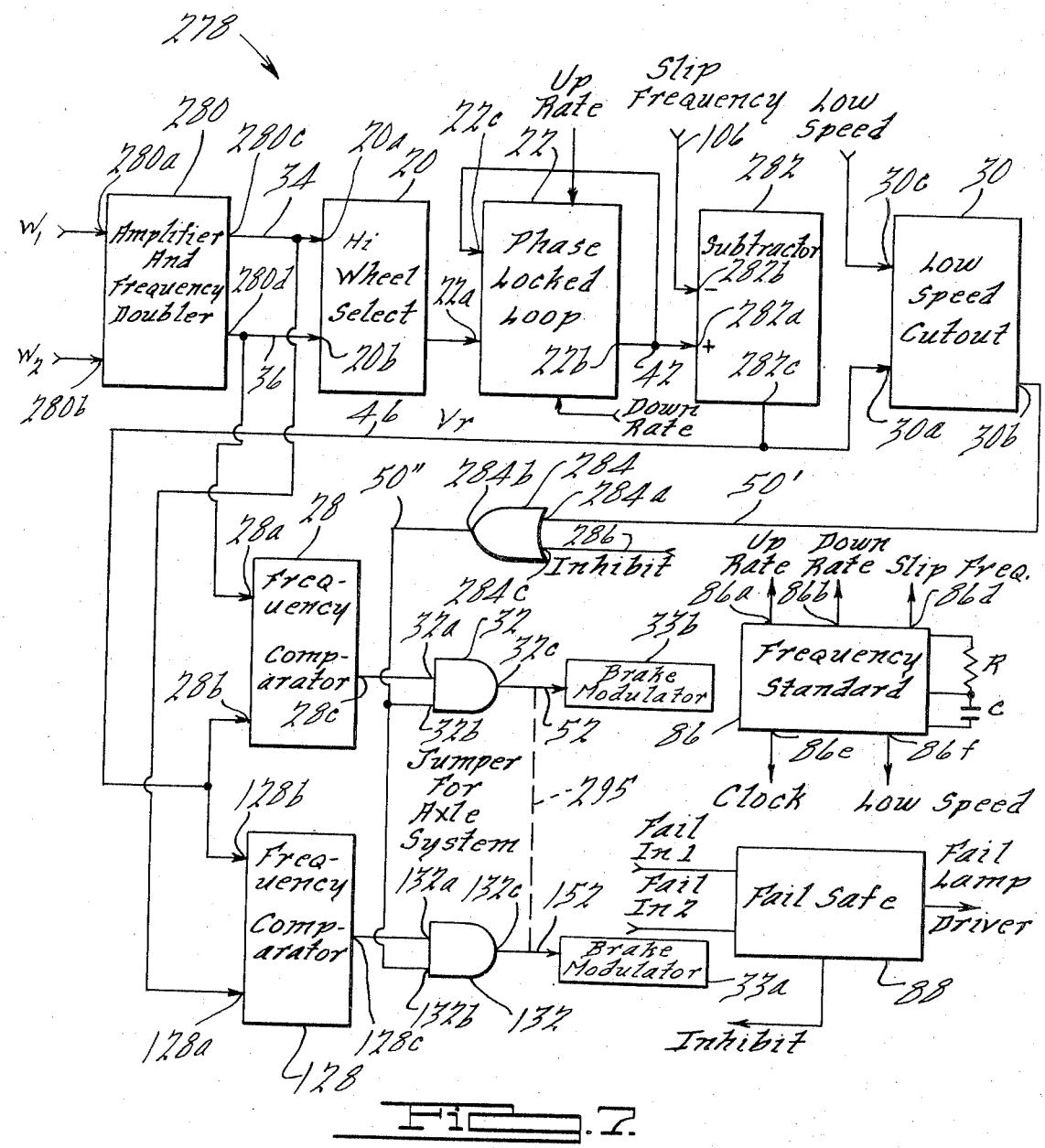
FIG. 7 is an electronic schematic diagram in block form of another electronic skid control circuit according to the present invention.

FIG. 7 illustrates another skid control circuit 278. In FIG. 7, like numerals from the previous figures are used to designate like components. In addition, circuit 278 comprises an amplifier and frequency doubler circuit 280, a frequency subtractor circuit 282 and a gating circuit 284. Circuit 280 comprises an input 280a to which signal $W_1$ is supplied and another input 280b to which signal $W_2$ is supplied. Circuit 280 amplifies and frequency doubles each signal so that the frequency doubled version of signal $W_1$ is developed at output 280c and the amplified and frequency doubled version of signal $W_2$ is developed at output 280d. Such frequency doubling improves the resolution of the system. Output 280c is coupled via connection 34 to both input 20a of circuit 20 and input 128a of circuit 128. Output 280d is coupled via connection 36 to both input 20b of circuit 20 and input 28a of circuit 28. Circuit 282 comprises an input 282a which is coupled via connection 42 with output 22b of circuit 22. Output 22b is coupled directly with its input 22c via connection 42, circuit 24 not being utilized in FIG. 7. Circuit 282 comprises another input 282b which is coupled via connection 106 with output 86d of circuit 86. An output 282c of circuit 282 is coupled via connection 46 with inputs 28b and 128b and 30a. The output signal at output 282c is signal $V_r$. Output 30b of circuit 30 is coupled to an input 284a of circuit 284. Output 284b of circuit 284 is coupled to inputs 32b and 132b of circuits 32 and 132. The other input 284c of circuit 284 is coupled via connection 286 with output 88c of circuit 88. Fail safe circuit 88 monitors various signals which are supplied to various inputs such as Fail In 1 and Fail In 2. When a failure is sensed, an inhibit signal is supplied to gate 284 which prevents modulators 33a and 33b from being actuated. A failure signal is used to actuate a failure lamp visible to the driver to indicate failure of the system. In a modified form of the invention, outputs 32c and 132c may be jumpered together as at 295. The jumper is used where the brakes are operable from a common fluid system and only a single brake modulator is required. The remainder of the connections of circuit 278 are similar to those of the preceding Figures.

Circuit 278 operates as follows. When the frequency of the signal at output 282c of subtractor circuit 282 exceeds the frequency of the signal from either wheel speed sensor, the brakes of the wheel with which that sensor is associated are modulated. The signal at output 282c represents the speed of the vehicle minus a preselected slip as represented by the slip frequency signal, so long as the deceleration of the faster running wheel does not exceed a predetermined value. When that value is exceeded, the rate at which the frequency of the signal decreases limited by the downrate signal with circuit 280 operating in the same fashion as circuits 60, 80 and 82 of FIG. 3. In this way, the frequency of the reference speed signal $V_r$ represents the speed of the faster wheel minus less a constant slip speed.

While it will be apparent that the preferred embodiments of the invention disclosed are well calculated to fulfill the objects above stated, it will be appreciated that the invention is susceptible to modification, variation and change without departing from the spirit thereof.

Parts List for Selected Circuit Components

| | |
|---|---|
| frequency comparator 28 | Motorola No. MC 4344 |
| VCO 64 | RCA Digital Integrated Circuit No. CD 4046 |
| Shift register 82 | RCA Digital Integrated Circuit No. CD 4031 |
| counter 184 | Texas Instruments No. 74193 |
| binary rate multiplier 186 | Texas Instruments No. SN 7497 |

I claim:

1. A skid control system for skid controlling at least one skid-controlled wheel of a multi-wheeled vehicle via fluid pressure modulation of pressure fluid applied to a brake system operatively associated with said at least one skid-controlled wheel, said skid control system comprising speed sensing means associated with said at least one skid-controlled wheel for developing a repetitive wheel speed signal whose repetition rate represents the speed of said at least one skid-controlled wheel, and skid control circuit means for developing a skid control signal for skid controlling said at least one skid-controlled wheel, said skid control circuit means comprising circuit means including reference generating means for developing from at least one selected wheel of the vehicle a repetitive reference signal, said reference generating means including modulating means for modulating the repetition rate of said reference signal in accordance with the speed of said at least one selected wheel, said modulating means comprising means for causing the repetition rate of said reference signal to represent a speed substantially corresponding to the speed of said at least one selected wheel so long as deceleration thereof does not exceed a predetermined value and for causing the repetition rate of said reference signal to change in a predetermined fashion when the deceleration of said at least one selected wheel exceeds said predetermined value, and comparator circuit means for comparing the repetition rate of said reference signal with the repetition rate of said wheel speed signal and for developing said skid control signal when the repetition rate of said wheel speed signal differs from the repetition rate of said reference signal by a predetermined amount, and modulating means operatively coupling said brake system with said circuit means and responsive to said skid control signal for modulating fluid pressure in said brake system.

2. The skid control system of claim 1 wherein said comparator circuit means comprises means for developing said skid control signal when the repetition rate of said wheel speed signal falls below the repetition rate of said reference signal.

3. The skid control system of claim 1 wherein said circuit means comprises means for causing the repetition rate of said reference signal to increase with increasing speed of said at least one selected wheel and to decrease with decreasing speed of said at least one selected wheel.

4. The skid control sytem of claim 1 wherein said circuit means comprises means for causing the repetition rate of said reference signal to represent a speed which is slightly less than the actual speed of said at least one selected wheel so long as deceleration of said at least one selected wheel does not exceed said predetermined value.

5. The skid control system of claim 1 wherein said circuit means comprises means for causing the repetition rate of said reference signal to represent a speed which differs from the actual speed of said at least one selected wheel by a predetermined amount so long as deceleration of said at least one selected wheel does not exceed said predetermined value.

6. The skid control system of claim 1 wherein said circuit means comprises means for causing the repetition rate of said reference signal to be in proportion to the speed of said at least one selected wheel so long as deceleration of said at least one selected wheel does not exceed said predetermined value.

7. The skid control system of claim 1 wherein said circuit means comprises means for causing the repetition rate of said reference signal to decrease in predetermined fashion when deceleration of said at least one selected wheel exceeds said predetermined value.

8. The skid control system of claim 1 wherein said circuit means comprises means for causing the repetition rate of said reference signal to decrease at a constant rate when the deceleration of said at least one selected wheel exceeds said predetermined value.

9. The skid control system of claim 1 wherein said at least one selected wheel of the vehicle is the same as said at least one skid-controlled wheel whereby said wheel speed signal is supplied to said reference generating means, said reference generating means modulating the repetition rate of said reference signal in accordance with said wheel speed signal.

10. The skid control system of claim 1 wherein said at least one selected wheel and said at least one skid-controlled wheel are on a common axle of the vehicle.

11. The skid control system of claim 1 wherein said at least one skid-controlled wheel includes a pair of wheels and said speed sensing means includes first and second wheel speed sensors respectively operatively coupled with the respective wheels of said pair of wheels, said first and second wheel speed sensors providing first and second velocity signals respectively representing the respective velocities of the respective wheels of said pair of wheels, said speed sensing means further including sensing circuit means operatively coupled with said first and second sensors to receive said first and second velocity signals as inputs thereto and to provide said wheel speed signal as an output thereof.

12. The skid control system of claim 11 wherein said sensing circuit means includes means for causing the repetition rate of said wheel speed signal to represent exclusively the speed of one wheel of said pair of wheels.

13. The skid control system of claim 12 wherein said sensing circuit means includes means for causing the repetition rate of said wheel speed signal to represent the speed of the slower wheel of said pair of wheels.

14. The skid control system of claim 13 wherein said system includes means for causing a signal representative of the speed of the faster wheel of said pair of wheels to be supplied to said reference generating means, said reference generating means modulating the repetition rate of said reference signal in accordance with the speed of said faster wheel.

15. A digital skid control system for skid controlling at least one skid-controlled wheel of a multi-wheeled vehicle via fluid pressure modulation of pressure fluid applied to a brake system operatively associated with said at least one skid-controlled wheel, said digital skid control system comprising speed sensing means associated with said at least one skid-controlled wheel for developing a digital wheel speed signal whose frequency represents the speed of said at least one skid-controlled wheel, and skid control circuit means for developing a skid control signal for skid controlling said at least one skid-controlled wheel, said skid control circuit means comprising circuit means including reference generating means for developing from at least one selected wheel of the vehicle a digital reference signal, said reference generating means including modulating means for modulating the frequency of said reference signal in accordance with the speed of said at least one selected wheel such that so long as deceleration of said at least one selected wheel does not exceed a predetermined value, the frequency of said digital reference signal represents a speed substantially corresponding to the speed of said at least one selected wheel, but when the deceleration of said at least one selected wheel exceeds said predetermined value, the frequency of said digital reference signal changes in a predetermined fashion and comparator circuit means for comparing the frequency of said digital reference signal with the frequency of said digital wheel speed signal and for developing said skid control signal when the frequency of said digital wheel speed signal differs from the frequency of said digital reference signal by a predetermined amount, and modulating means operatively coupling said brake system with said skid control circuit means and responsive to said skid control signal for modulating the fluid pressure in said brake system.

16. The digital skid control system of claim 15 wherein said comparator circuit means comprises means for developing said skid control signal when the frequency of said digital wheel speed signal falls below the frequency of said digital reference signal.

17. The digital skid control system of claim 15 wherein said circuit means comprises means for causing the frequency of said digital reference signal to increase with increasing speed of said at least one selected wheel and to decrease with decreasing speed of said at least one selected wheel.

18. The digital skid control system of claim 15 wherein said circuit means comprises means for causing the frequency of said digital reference signal to represent a speed which is slightly less than the actual speed of said at least one selected wheel so long as deceleration of said at least one selected wheel does not exceed said predetermined value.

19. The digital skid control system of claim 15 wherein said circuit means comprises means for causing the frequency of said digital reference signal to represent a speed which differs from the actual speed of said at least one selected wheel by a predetermined amount so long as deceleration of said at least one selected wheel does not exceed said predetermined value.

20. The digital skid control system of claim 15 wherein said circuit means comprises means for causing the frequency of said digital reference signal to be in proportion to the speed of said at least one selected wheel so long as deceleration of said at least one selected wheel does not exceed said predetermined value.

21. The digital skid control system of claim 15 wherein said circuit means comprises means for causing the frequency of said digital reference signal to decrease in predetermined fashion when deceleration of said at least one selected wheel exceeds said predetermined value.

22. The digital skid control system of claim 15 wherein said circuit means comprises means for causing the frequency of said digital reference signal to decrease at a constant rate when the deceleration of said at least one selected wheel exceeds said predetermined value.

23. The digital skid control system of claim 15 wherein said means for developing said digital reference signal from said at least one selected wheel comprises a rate limited phase locked loop circuit for developing said digital reference signal.

24. The digital skid control system of claim 23 wherein said rate limited phase locked loop circuit comprises means for developing an output signal whose frequency is a multiple of the frequency of said digital reference signal and wherein said skid control circuit means includes means for frequency dividing the frequency of said output signal to generate said digital reference signal.

25. The digital skid control system of claim 15 wherein said skid control circuit means comprises analogue circuit means for developing a vehicle velocity analogue signal whose magnitude represents a speed substantially corresponding to the speed of said at least one selected wheel so long as deceleration of said at least one selected wheel does not exceed said predetermined value, but when the deceleration of said at least one selected wheel exceeds said predetermined value, the magnitude of said vehicle velocity analogue signal changes in a predetermined fashion and digital circuit means operatively coupled with said analogue circuit means and responsive to said vehicle velocity analogue signal for causing the frequency of said digital reference signal to vary in accordance with the magnitude of said vehicle velocity analogue signal.

26. The digital skid control system of claim 25 wherein said digital circuit means includes a voltage controlled oscillator responsive to the magnitude of said vehicle velocity analogue signal.

27. The digital skid control system of claim 26 including means for setting an operating characteristics of said voltage controlled oscillator such that the frequency thereof includes a slip factor representing a predetermined amount by which the frequency of the digital reference signal differs from a frequency corresponding to the actual speed of said selected wheel.

28. The digital skid control system of claim 15 wherein said at least one selected wheel of the vehicle is the same as said at least one skid-controlled wheel whereby said digital wheel speed signal is supplied to said reference generating means, said reference generating means modulating the frequency of said reference signal in accordance with said digital wheel speed signal.

29. The digital skid control system of claim 15 wherein said at least one selected wheel and said at least one skid-controlled wheel are on a common axle of the vehicle.

30. The digital skid control system of claim 15 wherein said at least one skid-controlled wheel includes a pair of wheels and said speed sensing means includes first and second wheel speed sensors respectively operatively coupled with the respective wheels of said pair of wheels, said first and second wheel speed sensors providing first and second velocity signals respectively representing the respective velocities of the respective wheels of said pair of wheels, said speed sensing means further including sensing circuit means operatively coupled with said first and second sensors to receive said first and second velocity signals as inputs thereto and to provide said digital wheel speed signal as an output thereof.

31. The digital skid control system of claim 30 wherein said sensing circuit means includes means for causing the frequency of said digital wheel speed signal to represent exclusively the speed of one wheel of said pair of wheels.

32. The digital skid control system of claim 31 wherein said sensing circuit means includes means for causing the frequency of said digital wheel speed signal to represent the speed of the slower wheel of said pair of wheels.

33. The digital skid control system of claim 32 wherein said system includes means for causing a signal representative of the speed of the faster wheel of said pair of wheels to be supplied to said reference generating means, said reference generating means modulating the repetition rate of said reference signal in accordance with the speed of said faster wheel.

34. A skid control system for skid controlling at least one skid-controlled wheel of a multi-wheeled vehicle via fluid pressure modulation of pressure fluid applied to a brake system operatively associated with said at least one skid-controlled wheel, said skid control system comprising wheel speed sensing means associated with said at least one skid-controlled wheel for developing a repetitive wheel speed signal whose repetition rate represents the speed of said at least one skid-controlled wheel, and skid control means for skid controlling said at least one skid-controlled wheel comprising skid control circuit means, means operatively coupling said skid control circuit means with said wheel speed sensing means so that said wheel speed signal is supplied to said skid control circuit means, said skid control circuit means comprising reference generating means for developing from at least one selected wheel of the vehicle a repetitive reference speed signal, said reference generating means including modulating means for modulating the repetition rate of said reference speed signal such that the repetition rate of said reference speed signal represents a speed substantially corresponding to the speed of said at least one selected wheel so long as said at least one selected wheel is not in an incipient skid condition and for modulating the repetition rate of said reference speed signal such that the repetition rate of said reference speed signal changes in a predetermined fashion representing desired vehicle deceleration when said at least one selected wheel is in an incipient skid condition, said skid control circuit means further including comparator circuit means for comparing the repetition rate of said reference speed signal with the repetition rate of said wheel speed signal and for developing a skid control signal when the repetition rate of said wheel speed signal differs from the repetition rate of said reference speed signal by a predetermined amount and modulator means operatively coupling said brake system with said skid control circuit means and responsive to said skid control signal for modulating the fluid pressure in said brake system.

35. The skid control system of claim 34 wherein said reference generating means comprises means for causing the repetition rate of said reference speed signal to represent a speed which is equivalent to the actual speed of said at least one selected wheel modified by a predetermined quantity so long as said at least one selected wheel is not in an incipient skid condition.

36. The skid control system of claim 34 wherein said reference generating means comprises means for causing the repetition rate of said reference speed signal to represent a speed which differs from the actual speed of said at least one selected wheel by a preselected amount so long as said at least one selected wheel is not in an incipient skid condition.

37. The skid control system of claim 34 wherein said reference generating means comprises means for causing the repetition rate of said reference speed signal to represent a speed which differs from the actual speed of said at least one selected wheel by a preselected amount so long as said at least one selected wheel is not in an incipient skid condition.

38. The skid control system of claim 34 wherein said reference generating means comprises means for causing the repetition rate of said reference speed signal to represent a speed which is slightly less than the actual speed of said at least one selected wheel so long as said at least one selected wheel is not in an incipient skid condition.

39. The skid control system of claim 34 wherein said reference generating means comprises means for causing the repetition rate of said reference speed signal to represent a speed in proportion to the actual speed of said at least one selected wheel so long as said at least one selected wheel is not in an incipient skid condition.

40. The skid control system of claim 39 wherein said reference generating means comprises means for causing the repetition rate of said reference speed signal to increase with increasing speed of said at least one selected wheel and to decrease with decreasing speed of said at least one selected wheel so long as said at least one selected wheel is not in an incipient skid condition.

41. The skid control system of claim 40 wherein said skid control circuit means comprises means for causing the repetition rate of said reference speed signal to decrease in predetermined fashion when said at least one selected wheel is in an incipient skid condition.

42. The skid control system of claim 40 wherein said skid control circuit means comprises means for causing the repetition rate of said reference speed signal to decrease at a constant rate when said at least one selected wheel is in an incipient skid condition.

43. The skid condition system of claim 42 wherein said comparator circuit means comprises means for developing said skid control signal when the repetition rate of said wheel speed signal falls below the repetition rate of said reference speed signal.

44. The skid control system of claim 34 wherein said means for developing the repetitive reference speed signal comprises means for causing the repetition rate of said reference speed signal to increase with increasing vehicle speed and to decrease with decreasing vehicle speed.

45. The skid control system of claim 44 wherein said skid control circuit means comprises means for causing the repetition rate of said reference speed signal to decrease in predetermined fashion when said at least one selected wheel is in an incipient skid condition.

46. The skid control system of claim 45 wherein said skid control circuit means comprises means for causing the repetition rate of said reference speed signal to decrease at a constant rate when said at least one selected wheel is in an incipient skid condition.

47. The skid control system of claim 46 wherein said comparator circuit means comprises means for developing said skid control signal when the repetition rate of said wheel speed signal falls below the repetition rate of said reference speed signal.

48. The skid control system of claim 34 wherein said reference generating means includes phase locked loop circuit means operatively coupled with said at least one selected wheel.

49. The skid control system of claim 48 wherein said phase locked loop circuit means includes means for limiting the rate of change of the repetition rate of said reference speed signal to thereby cause the repetition rate of said reference speed signal to change in said predetermined fashion when said at least one selected wheel is in an incipient skid condition.

50. The skid control system of claim 49 wherein said phase locked loop circuit means includes means for causing the rate of decrease in the repetition rate of said reference speed signal to be rate limited thereby causing the repetition rate of said reference speed signal to change in said predetermined fashion.

51. The skid control system of claim 49 wherein said skid control circuit means comprises means for modifying the repetition rate of the output signal of said phase locked loop circuit means by a predetermined quantity to thereby generate said reference speed signal.

52. The skid control system of claim 51 wherein said means for modifying the repetition rate of the output signal of said phase locked loop circuit means by a predetermined quantity comprises means for subtracting a predetermined repetition rate from the repetition rate of the output signal of said phase locked loop circuit means.

53. The skid control system of claim 34 wherein said means for developing said reference speed signal includes counting circuit means operatively coupled with said at least one selected wheel such that the count in said counting circuit means corresponds to the speed of said at least one selected wheel so long as said at least one selected wheel is not in an incipient skid condition and means operatively coupled with said counting circuit means for causing the repetition rate of said reference speed signal to vary in accordance with the count in said counting circuit means.

54. The skid control system of claim 34 wherein said skid control circuit means comprises analogue circuit means operatively coupled with said at least one selected wheel for developing an analogue reference speed signal whose magnitude represents a speed substantially corresponding to the speed of said at least one selected wheel so long as said at least one selected wheel is not in an incipient skid condition and means operatively coupled with said analogue circuit means for causing the repetition rate of said reference speed signal to vary in accordance with the magnitude of the analogue reference speed signal.

55. The skid control system of claim 54 wherein said means operatively coupled with said analogue circuit means comprises a voltage controlled oscillator.

56. A digital skid control system for skid controlling at least one skid-controlled wheel of a multi-wheeled vehicle via fluid pressure modulation of pressure fluid applied to a brake system operatively associated with said at least one skid-controlled wheel, said skid control system comprising wheel speed sensing means associated with said at least one skid-controlled wheel for developing a digital wheel speed signal whose frequency represents the speed of said at least one skid-controlled wheel and skid control means for skid controlling said at least one skid-controlled wheel comprising skid control circuit means, means operatively coupling said skid control circuit means with said wheel speed sensing means so that said wheel speed signal is supplied to said skid control circuit means, said skid control circuit means comprising reference generating means for developing from at least one selected wheel of the vehicle a digital reference speed signal, said reference generating means including modulating means for modulating the frequency of said reference speed signal such that the frequency of said reference speed signal represents a speed substantially corresponding to the speed of said at least one selected wheel so long as said at least one selected wheel is not in an incipient skid condition and for modulating the frequency of said reference speed signal such that the frequency of said reference speed signal changes in a predetermined fashion representing desired vehicle deceleration when said at least one selected wheel is in an incipient skid condition, said skid control circuit means further including comparator circuit means for comparing the frequency of said digital reference speed signal with the frequency of said digital wheel speed signal and for developing a skid control signal when the frequency of said digital wheel speed signal differs from the frequency of said digital reference speed signal by a predetermined amount and modulator means operatively coupled said brake system with said skid control circuit means and responsive to said skid control signal for modulating the fluid pressure in said brake system.

57. The digital skid control system of claim 56 wherein said reference generating means comprises means for causing the frequency of said digital reference speed signal to represent a speed which is equivalent to the actual speed of said at least one selected wheel modified by a predetermined quantity so long as said at least one selected wheel is not in an incipient skid condition.

58. The digital skid control system of claim 56 wherein said reference generating means comprises means for causing the frequency of said digital reference speed signal to represent a speed which is a selected fraction of the actual speed of said at least one selected wheel so long as said at least one selected wheel is not in an incipient skid condition.

59. The digital skid control system of claim 56 wherein said reference generating means comprises means for causing the frequency of said digital reference speed signal to represent a speed which differs from the actual speed of said at least one selected wheel by a preselected amount so long as said at least one selected wheel is not in an incipient skid condition.

60. The digital skid control system of claim 56 wherein said reference generating means comprises means for causing the frequency of said digital reference speed signal to represent a speed which is less than the actual speed of said at least one selected wheel so long as said at least one selected wheel is not in an incipient skid condition.

61. The digital skid control system of claim 56 wherein said reference generating means comprises means for causing the frequency of said digital reference speed signal to be proportional to the actual speed of said at least one selected wheel so long as said at least one selected wheel is not in an incipient skid condition.

62. The digital skid control system of claim 61 wherein said reference generating means comprises means for causing the frequency of said digital reference speed signal to increase with increasing speed of said at least one selected wheel and to decrease with decreasing speed of said at least one selected wheel so long as said at least one selected wheel is not in an incipient skid condition.

63. The digital skid control system of claim 62 wherein said skid control circuit means comprises means for causing the frequency of said digital reference speed signal to decrease in predetermined fashion when said at least one selected wheel is in an incipient skid condition.

64. The digital skid control system of claim 62 wherein said skid control circuit means comprises means for causing the frequency of said digital reference speed signal to decrease at a constant rate when said at least one selected wheel is in an incipient skid condition.

65. The digital skid control system of claim 64 wherein said comparator circuit means comprises means for developing said skid control signal when the frequency of said digital wheel speed signal falls below the frequency of said digital reference speed signal.

66. The digital skid control system of claim 56 wherein said reference generating means comprises means for causing the frequency of said digital reference speed signal to increase with increasing speed of said at least one selected wheel and to decrease with decreasing speed of said at least one selected wheel so long as said at least one selected wheel is not in an incipient skid condition.

67. The digital skid control system of claim 66 wherein said skid control circuit means comprises means for causing the frequency of said digital reference speed signal to decrease in predetermined fashion when said at least one selected wheel is in an incipient skid condition.

68. The digital skid control system of claim 67 wherein said skid control circuit means comprises means for causing the frequency of said digital reference speed signal to decrease at a constant rate when said at least one selected wheel is in an incipient skid condition.

69. The digital skid control system of claim 56 wherein said reference generating means includes phase locked loop circuit means operatively coupled with said at least one selected wheel.

70. The digital skid control system of claim 69 wherein said phase locked loop circuit means includes means for limiting the rate of change of the frequency of said digital reference speed signal to thereby cause the frequency of said digital reference speed signal to change in said predetermined fashion when said at least one selected wheel is in an incipient skid condition.

71. The digital skid control system of claim 70 wherein said phase locked loop circuit means includes means for causing the rate of decrease in the frequency of said digital reference speed signal to be rate limited thereby causing the frequency of said digital reference speed signal to change in said predetermined fashion.

72. The digital skid control system of claim 70 wherein said skid control circuit means comprises means for frequency modifying the output signal of said phase locked loop circuit means by a predetermined quantity to thereby generate said digital reference speed signal.

73. The digital skid control system of claim 72 wherein said means for frequency modifying the frequency of the output signal of said phase locked loop circuit means by a predetermined quantity comprises means for subtracting a predetermined frequency from the frequency of the output signal of said phase locked loop circuit means.

74. In a skid control system for skid controlling at least one wheel of a multi-wheeled vehicle via fluid pressure modulation of pressure fluid applied to a brake system operatively associated with said at least one wheel, skid control circuit means for developing a skid control signal for skid controlling said at least one wheel, said skid control circuit means including electronic circuit means for generating a repetitive reference signal, said electronic circuit means including modulating means for causing the repetition rate of said reference signal to represent a speed substantially corresponding to the speed of at least one selected wheel of the vehicle so long as the deceleration of said at least one selected wheel does not exceed a predetermined value, and for causing the repetition rate of said reference signal to change in a predetermined fashion representing desired vehicle deceleration when the deceleration of said at least one selected wheel exceeds said predetermined value.

75. The skid control circuit means of claim 74 wherein said circuit means includes means for causing the repetition rate of said reference signal to increase when the speed of said at least one selected wheel increases and to decrease when the speed of said at least one selected wheel decreases so long as the deceleration of said at least one selected wheel does not exceed said predetermined value.

76. The skid control circuit means of claim 75 wherein said circuit means includes means for causing the rate of decrease of the repetition rate of said reference signal to be limited to a predetermined rate when the deceleration of said at least one selected wheel exceeds said predetermined value.

77. The skid control circuit means of claim 74 wherein said circuit means includes means for generating said reference signal in digital form.

78. The skid control circuit means of claim 74 further including speed sensing means operatively associated with said at least one selected wheel for supplying to said electronic circuit means a periodic speed signal whose frequency represents the speed of said at least one selected wheel.

79. A wheel control system for controlling the speed of a wheel of a multi-wheeled vehicle comprising speed sensing means associated with said wheel for developing a repetitive wheel speed signal whose repetition rate represents the speed of said wheel and wheel control circuit means for developing a wheel control signal for controlling the speed of said wheel, said wheel control circuit means comprising circuit means including reference generating means for developing from another wheel of the vehicle a repetitive reference signal said reference generating means including modulating means for causing the repetition rate of said reference signal to represent a speed substantially corresponding to the speed of said last-mentioned wheel so long as deceleration thereof does not exceed a predetermined value and for causing, when the deceleration of said last-mentioned wheel exceeds said predetermined value, the frequency of said reference signal to change in a predetermined fashion and comparator circuit means for comparing the repetition rate of said reference signal with the repetition rate of said wheel speed signal and for developing said wheel control signal when the repetition rate of said wheel speed signal differs from the repetition rate of said reference signal by a predetermined amount, and modulating means operatively coupling said first wheel with said circuit means and responsive to said wheel control signal for modulating the speed of said first wheel.

* * * * *

UNITED STATES PATENT OFFICE
CERTIFICATE OF CORRECTION

Patent No. 3,838,889           Dated October 1, 1974

Inventor(s) Roger L. Miller

It is certified that error appears in the above-identified patent and that said Letters Patent are hereby corrected as shown below:

Column 2, line 47, "2o" should be --20--. Column 3, line 62, "to" should be --so--. Column 6, line 24, "eastablish" should be --establish--. Column 8, line 21, "82e" should be --82a--. Column 21, line 17, "coupled" should be --coupling--.

Signed and sealed this 31st day of December 1974.

(SEAL)
Attest:

McCOY M. GIBSON JR.          C. MARSHALL DANN
Attesting Officer              Commissioner of Patents